July 21 1925.

A. E. BALLARD ET AL

YEAST PRODUCT

Filed March 23, 1922

1,546,820

INVENTORS
Albert E. Ballard and
Emil L. Myrsky
BY
Davis & Simms
ATTORNEYS.

Patented July 21, 1925.

1,546,820

UNITED STATES PATENT OFFICE.

ALBERT E. BALLARD AND EMIL L. MYRSKY, OF ROCHESTER, NEW YORK.

YEAST PRODUCT.

Application filed March 23, 1922. Serial No. 546,071.

*To all whom it may concern:*

Be it known that we, ALBERT E. BALLARD and EMIL L. MYRSKY, citizens of the United States, and residents of Rochester, in the county of Monroe and State of New York, have invented certain new and useful Improvements in a Yeast Product, of which the following is a specification.

The present invention relates to a yeast product and an object thereof is to associate with a yeast body a means which will render such body palatable. A further object of the invention is to provide for a yeast body an air proof coating which may be eaten with the yeast body and which will, at the same time, prevent chemical action between the yeast body and a palatable element associated with said body.

To these and other ends, the invention consists of certain parts and combinations of parts, all of which will be hereinafter described: the novel features being pointed out in the appended claims:

The taking of yeast internally is recommended by physicians for blood diseases. The taste of the yeast, however, is highly objectionable and is nauseating to the user. According to this invention palatable means is associated with the yeast body and is preferably separated from such body by an element which will prevent chemical action between the palatable element and the yeast body and which will also preferably act to exclude air from the yeast body so that the latter is maintained in a moist condition.

Figure 1:
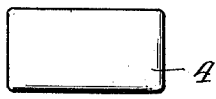
Fig. 1 is a plan view of one embodiment of the product.
Figure 2:
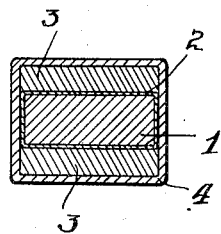
Fig. 2 is a longitudinal section through the same embodiment.

In the embodiment of the invention illustrated in Figs. 1 and 2, 1 indicates the yeast body which is preferably in the form of compressed yeast in the moist condition. This yeast body is coated with a material 2 which will exclude the air from the yeast body and which, at the same time, is made of a material which may be taken internally without bad effects on the human system. In this instance, this coating is cocoa butter, although any edible vegetable fat may be employed and in fact, although not so desirable, paraffin or a mineral oil may be used, in any case care being taken to select a coating which will not re-act chemically with the yeast. There may also be associated with the body an edible element 3 which will act to disintegrate the yeast and to prevent the sticking of the latter to the teeth. This edible disintegrating element, in this instance, is in the form of a cooked cereal, such as sweetened cracker or cake in two layers on opposite sides of the yeast body 1 on the exterior of the coating 2, being preferably applied to the coating while the latter is soft so that the cereal-containing body 3 will adhere thereto. The sugar in the cake or cereal-containing product is held from re-action with the yeast by the coating 2 and the moisture from the yeast is prevented from passing to the yeast disintegrating element by such coating 2.

In order to still further increase the palatability of the product, a sugar containing coating 4 may be provided flavored by chocolate or other suitable flavoring and enclosing the yeast body 1, its coating 2 and the cereal or disintegrating element 3, this sugar containing coating also acting to prevent the cereal body 3 from becoming stale.

Figure 3:
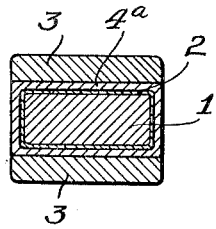
Fig. 3 is a longitudinal section through another embodiment of the invention.

In the embodiment illustrated in Fig. 3 the yeast body 1 is surrounded by a coating 2 of cocoa butter or other edible vegetable fat, paraffin or other material which will exclude air and prevent chemical action between the yeast body and the surrounding material and may be taken internally without injury to the user. A sugar containing coating $4^a$ is, in this instance, applied directly over the coating 2 and the yeast disintegrating material 3 is, while the coating is soft, applied in two layers on opposite sides of the body to the sugar coating $4^a$ preferably while the latter is soft. The whole may then be enclosed in a tinfoil or other air proof wrapper to preserve the yeast disintegrating body 3 against air and dirt.

From the foregoing it will be seen that there has been provided a moist pressed yeast body enclosed in a coating containing sugar and preferably also a flavoring matter, such as chocolate which, when combined with yeast in the stomach, produces a reaction or fermentation. This does away with the necessity of taking a glass of sugar water after eating yeast as is generally recommended by physicians. The sugar containing coating is held separated from the yeast in the product by a coating to prevent re-action in the product. This coating also excludes air from the yeast and is preferably in the form of an edible vegetable fat although any other material may be used which will not be injurious to the human system, and, at the same time, perform the foregoing functions. The yeast product also has associated with it a disintegrating element preferably in the form of a cooked cereal product containing also sugar, this product being separated from the yeast by the air proof coating so that the moisture from the yeast cannot penetrate the cereal containing product, and the cereal containing product is furthermore enclosed either by tinfoil or by a sugar coating so as to protect the same against the action of air.

What we claim as our invention and desire to secure by Letters Patent is:

1. A medicinal yeast product comprising a body of pure moist yeast, a sugar containing element, and edible means for excluding air from the moist yeast body and preventing chemical action between the yeast body and the sugar containing element.

2. A medicinal yeast product comprising a body of pure moist yeast, a yeast disintegrating edible element, and edible means for excluding air from the moist yeast body and preventing chemical action between said body and the yeast disintegrating edible element.

3. A medicinal yeast product comprising a body of pure moist yeast, a cereal containing element, and edible means for excluding air from the moist yeast body and for preventing chemical action between the yeast body and the cereal containing element.

4. A medicinal yeast product comprising a body of pure moist yeast, two layers of cereal containing material arranged on opposite sides of the body, edible means surrounding the yeast body and adapted to exclude air therefrom and prevent chemical action between the yeast body and the two layers of cereal containing material, and edible means for enclosing the yeast body and the layers to exclude air from said layers.

5. A medicinal yeast product comprising a body of pure moist yeast, a coating of edible fat enclosing said body and chemically inert to said moist yeast body, a cereal containing element adhering to said coating, and edible means for enclosing said yeast body and the cereal containing element to prevent the entrance of air to the cereal containing element.

6. A medicinal yeast element comprising a body of pure moist yeast, a coating of edible vegetable fat enclosing said body and chemically inert thereto, and a cereal containing element adhering to said coating.

7. A medicinal yeast product comprising a body of pure moist yeast, a coating of edible vegetable fat enclosing said body and chemically inert thereto, a cereal containing element adhering to said coating, and a sugar containing coating enclosing said cereal containing element, edible vegetable fat and moist yeast body.

8. A medicinal yeast product having a sugar containing coating and comprising in addition to said coating a body of pure moist yeast and edible means separating said moist yeast body from said sugar containing coating to prevent chemical action between the body and the sugar containing coating.

9. A medicinal yeast product having a sugar containing coating, a body of pure moist yeast, and a coating of edible fat separating the moist yeast body from said sugar containing coating.

ALBERT E. BALLARD.
EMIL L. MYRSKY.